US007069118B2

(12) United States Patent
Coletrane et al.

(10) Patent No.: US 7,069,118 B2
(45) Date of Patent: Jun. 27, 2006

(54) APPARATUS, SYSTEM, AND METHOD FOR EXCHANGING VEHICLE IDENTIFICATION DATA

(75) Inventors: Candice Leontine Coletrane, Morrisville, NC (US); Ruthie D. Lyle, Durham, NC (US); Jamel Pleasant Lynch, Jr., Carrboro, NC (US); McGill Quinn, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 10/677,027

(22) Filed: Sep. 30, 2003

(65) Prior Publication Data

US 2005/0071052 A1 Mar. 31, 2005

(51) Int. Cl.
*B60Q 1/00* (2006.01)
*G08G 1/01* (2006.01)

(52) U.S. Cl. .......................... 701/1; 701/117; 340/436

(58) Field of Classification Search .................... 701/1, 701/117; 340/436, 438, 825.69, 825.72, 340/425.5, 901, 902, 905; 342/457, 455, 342/450, 454, 20, 22, 58, 69, 82, 125, 357.07
See application file for complete search history.

(56) References Cited

U.S. PATENT DOCUMENTS

| | | | | |
|---|---|---|---|---|
| 3,720,911 A | | 3/1973 | Bomar, Jr. | 340/52 F |
| 5,790,427 A | * | 8/1998 | Greer et al. | 702/127 |
| 5,910,766 A | | 6/1999 | Evans | 340/539 |
| 6,052,068 A | * | 4/2000 | Price R-W et al. | 340/933 |
| 6,141,611 A | * | 10/2000 | Mackey et al. | 701/35 |
| 6,211,777 B1 | | 4/2001 | Greenwood et al. | 340/436 |
| 6,249,232 B1 | | 6/2001 | Tamura et al. | 340/902 |
| 6,525,672 B1 | | 2/2003 | Chainer et al. | 340/904 |
| 6,650,252 B1 | * | 11/2003 | Miller, Jr. | 340/989 |
| 6,737,954 B1 | | 5/2004 | Chainer et al. | 340/3 |
| 6,741,168 B1 | * | 5/2004 | Webb et al. | 340/436 |
| 2002/0075167 A1 | | 6/2002 | Chainer et al. | 340/901 |
| 2003/0028298 A1 | | 2/2003 | Macky et al. | 701/35 |
| 2004/0006699 A1 | * | 1/2004 | von Mueller et al. | 713/185 |

FOREIGN PATENT DOCUMENTS

| | | |
|---|---|---|
| DE | 19802633 A1 | 7/1999 |

* cited by examiner

*Primary Examiner*—Dalena Tran
(74) *Attorney, Agent, or Firm*—Kunzler & Associates

(57) ABSTRACT

An apparatus, a system, and a process for exchanging vehicle identification information subsequent to a collision are provided. The apparatus, system, and process include a host identification device connected to a vehicle data system of a host vehicle. At the time of collision the vehicle data system sends the host identification device a collision indication. Responsive to the collision indication, the host identification device establishes a wireless network connection with one or more responding identification devices. The host identification device further assemblies a vehicle identifier. The vehicle identifier may be based on a unique vehicle identification number provided by the vehicle data system. The host identification device exchanges vehicle identifiers with one or more responding identification devices. In addition, the host identification device may store one or more vehicle identifiers. The host identification device may transmit one or more vehicle identifiers to an authorized collection device.

20 Claims, 6 Drawing Sheets

APPARATUS, SYSTEM, AND METHOD FOR EXCHANGING VEHICLE IDENTIFICATION DATA

BACKGROUND OF THE INVENTION

1. Field of the Invention

This invention relates to exchanging vehicle identification data and more particularly, to communicating vehicle identification data over a wireless network in response to a collision.

2. Description of the Related Art

Drivers and motor vehicles are occasionally involved in traffic collisions. Collisions are usually resolved amicably, with drivers exchanging identification and insurance information. Drivers typically also report their respective versions of the collision to an investigating police officer.

Unfortunately, on some occasions the drivers involved in a collision may not exchange information honestly or accurately. Drivers may communicate fraudulent information to avoid financial liability for a collision. A driver may also leave the scene of a traffic accident without exchanging information. Some drivers involved in collisions become so enraged or hostile that it is not safe to communicate with the hostile driver. As a result, drivers involved in a traffic accident may not always be able to safely exchange information.

Collision information is also sometimes not accurately communicated to the investigating police office or to an insurance representative. Drivers may honestly disagree about the facts of a collision, including the speed each vehicle was traveling or sequence of events in the collision. A driver may also fraudulently misrepresent the facts of a traffic accident. Vital information regarding a collision may be lost to the police investigators or to a driver's insurance company.

Wireless communication devices have been proposed that communicate a vehicle's identification information. Unfortunately, many wireless communication devices have been expensive to install in a vehicle. The communication devices often require adding sensors to detect collisions and cameras to capture collision information to the host vehicle, making the installation prohibitively expensive. Other wireless communication devices have been proposed that regularly transmit vehicle identification and state information. However, the regular transmission of vehicle information is often objectionable due to privacy concerns of drivers.

What is needed is a method, apparatus, and system that accurately and safely communicates identification information to the vehicles involved in a collision in response to the collision. What is further needed is a method, apparatus, and system that uses the vehicle's existing data system to detect collisions. Beneficially, such a process, apparatus, and system would automatically communicate vehicle identifier information between vehicles in the event of a collision and save the communicated information for retrieval. The process, apparatus, and system would also reduce the cost of exchanging vehicle identifiers by using the host vehicle's existing vehicle data system to detect collisions.

BRIEF SUMMARY OF THE INVENTION

The present invention has been developed in response to the present state of the art, and in particular, in response to the problems and needs in the art that have not yet been fully solved by currently available devices, systems, and methods for exchanging information between vehicles involved in an accident. Accordingly, the present invention has been developed to provide a process, apparatus, and system for automatically communicating vehicle information that overcome many or all of the above-discussed shortcomings in the art.

The apparatus for exchanging vehicle information is provided with a logic unit containing a plurality of modules configured to functionally execute the necessary steps of communicating information between vehicles involved in a collision. These modules in the described embodiments include an interface module, a communications module, a control module, and a memory module.

The interface module connects with a vehicle data system of a host vehicle. In one embodiment, the interface module connects with the host vehicle's control system. The interface module receives inputs from sensors and devices connected to the vehicle data system such as the host vehicle's air bags, speedometer, or global positioning system (GPS). The interface module receives a collision indication from the vehicle data system. In one embodiment, a signal that an air bag has inflated is a collision indication. In an alternative embodiment, a rapid deceleration reported by the speedometer is a collision indication. In a further embodiment, the interface module may connect to the vehicle data system of the host vehicle over the wireless network.

The control module identifies the collision indication from the inputs to the interface module. Responsive to the collision indication, the communications module establishes a wireless network connection with a respondent identification device. In one embodiment, the control module verifies that the respondent identification device is responding to the collision that caused the collision indication.

The control module assembles a vehicle identifier. In one embodiment, the vehicle identifier is assembled from host vehicle data collected by the interface module. The control module sends the host vehicle identifier to the respondent identification device through the communications module. In addition, the control module may receive a respondent vehicle identifier from the respondent identification device through the communications module.

The memory module stores the respondent vehicle identifier from the respondent identification device. In one embodiment, the memory module also stores the host vehicle identifier. In a certain embodiment, the memory module stores host vehicle state information.

The apparatus is further configured, in one embodiment, to report the stored vehicle identifiers over the wireless network connection to an authorized collection device. In a certain embodiment, the control module verifies the identity of the authorized collection device. Communications with the authorized collection device may be encrypted.

A system of the present invention is also presented for exchanging vehicle information. The system may be embodied in a wireless network of identification devices. In particular, the system, in one embodiment, includes a wireless network, one or more vehicle data systems, and two or more identification devices.

A host vehicle preferably includes a factory-installed vehicle data system. The vehicle data system receives inputs from one or more sensors in the host vehicle. In one embodiment, sensors include air bag sensors, speedometers, and accelerometers. The vehicle data system detects an event indicating a collision from a sensor.

A first identification device receives the collision indication from the vehicle data system. In one embodiment, the vehicle data system interprets the collision indication from the vehicle data system data. In an alternative embodiment, the first identification device interprets the collision indication from the vehicle data system's data. The first identification device assembles and stores a vehicle identifier for the host vehicle. In one embodiment, the first identification device also assembles and stores state information for the host vehicle.

The first identification device establishes a wireless network connection with a second identification device in response to one or more collision indications. In one embodiment, the first identification device verifies that the second identification device is responding to the same collision. The first identification device sends the host vehicle identifier to the second identification device. The second identification device sends a respondent vehicle identifier to the first identification device. The first identification device stores the respondent vehicle identifier.

In one embodiment, the first identification device establishes a wireless network connection with an authorized collection device. Authorized collection devices may include devices used by police or insurance investigators. The authorized collection device retrieves one or more vehicle identifiers from the first identification device. The authorized collection device may also establish a wireless network connection and retrieve vehicle identifiers from the second identification device.

A process of the present invention is also presented for exchanging vehicle information. The process in the disclosed embodiments substantially includes the steps necessary to carry out the functions presented above with respect to the operation of the described apparatus and system. In one embodiment, the process includes receiving a collision indication from a vehicle data system. The collision indication may be part of the vehicle data system's factory-installed data collection capabilities. The process establishes a wireless network connection with a respondent identification device. In addition, the process assembles a vehicle identifier and exchanges the vehicle identifier with the respondent identification device. In one embodiment, the vehicle identifier is assembled from vehicle identification information, insurance information, and a time stamp. In a certain embodiment, a user has programmed the identification device with the vehicle identification information. In an alternative embodiment, the identification device queries the vehicle data system for the vehicle identification information.

The process stores one or more vehicle identifiers. In addition, the process may transmit one or more vehicle identifiers to an authorized collection device. Communications with the authorized collection device may be encrypted. In one embodiment, the identification device verifies the identity of the authorized collection device.

In a further embodiment, the process includes querying the vehicle data system for state information. The process may store the state information. State information may also be transmitted to the authorized collection device.

The present invention automatically detects collisions and exchanges identification information with another vehicle involved in the collision, reducing the risks of collecting information after a collision and increasing the accuracy of the information. In one embodiment, the present invention further reduces the cost of installing an identification device by using a vehicle's existing vehicle data system to generate a collision indication. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
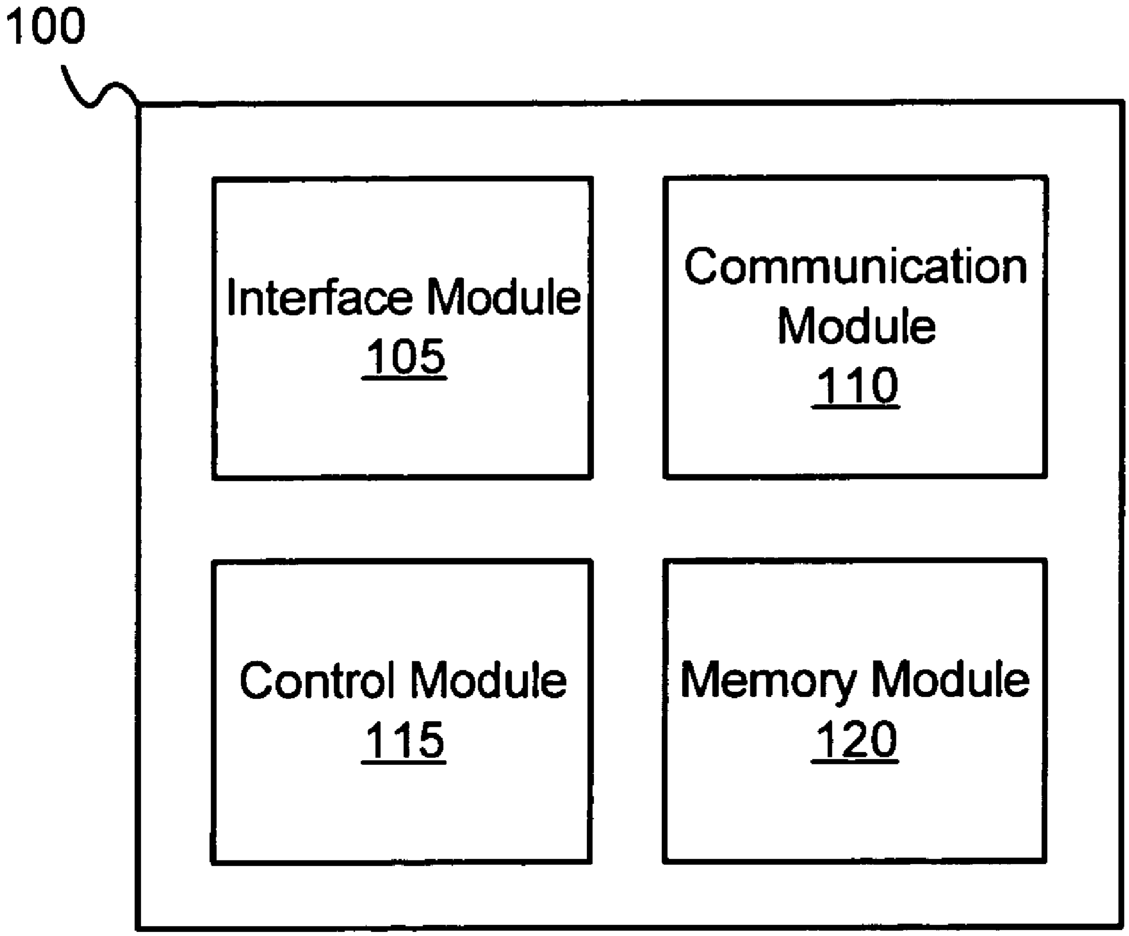
FIG. 1 is a block diagram illustrating one embodiment of an identification device in accordance with the present invention.

FIG. 1 depicts a block diagram illustrating one embodiment of an identification device 100 in accordance with the present invention. The identification device 100 includes an interface module 105, a communications module 110, a control module 115, and a memory module 120. The identification device 100 exchanges vehicle identifiers with a respondent identification device in the event of a vehicle collision.

The interface module 105 connects to a vehicle data system of a host vehicle. The vehicle data system may provide a collision indication and identification information to the interface module 105. The interface module 105 receives the collision indication from the vehicle data system. In one embodiment, the collision indication is an explicit notification of a collision event. In an alternative embodiment, the collision indication is an indirect indication of a collision. The control module 115 may interpret the vehicle data system data to determine if a collision indication has been received. In a certain embodiment, a deployed air bag comprises a collision indication. A rapid deceleration as indicated by a speedometer may also comprise a collision indication.

The communications module 110 establishes a wireless network connection with a respondent identification device. In one embodiment, the communications module 110 establishes a connection with each wireless device on a wireless network. Alternatively, the communications module 110 may interrogate each wireless device to determine which devices are identification devices. The communications module 110 may maintain the connection with each identification device.

The control module 115 assembles a vehicle identifier from a unique identification number. In one embodiment, the unique identification number is a factory-programmed serial number that is unique to the identification device 100. In an alternative embodiment, the unique identification number is based on a serial number that is programmed by a user. In a certain embodiment, the control module 115 queries the vehicle data system for the unique identification number. The unique identification number may comprise a vehicle's vehicle identification number ("VIN") or license plate number.

In one embodiment, the control module 115 adds additional information to the vehicle identifier. The additional information may include the time, the date, the collision indication, and the host vehicle's insurance information. In a certain embodiment, the vehicle identifier is encrypted. The encrypted vehicle identifier may only be decrypted by a person authorized to possess the decryption key such as a police investigator.

The control module 115 sends the vehicle identifier to the respondent identification device through the communications module 110. The communications module 110 may further receive a respondent vehicle identifier from the respondent identification device. The memory module 120 may store the vehicle identifiers from each of a plurality of respondent identification devices. In addition, the memory module 120 may store the host vehicle identifier.

Preferably, the identification device 100 receives a collision indication from the host vehicle's existing vehicle data system. The identification device 100 further assembles a vehicle identifier and exchanges vehicle identifiers with the respondent identification device in response to the collision indication. In a one embodiment, this exchange process occurs automatically. Preferably, the identification device 100 functions regardless of whether the host vehicle is running or not.

Figure 2:
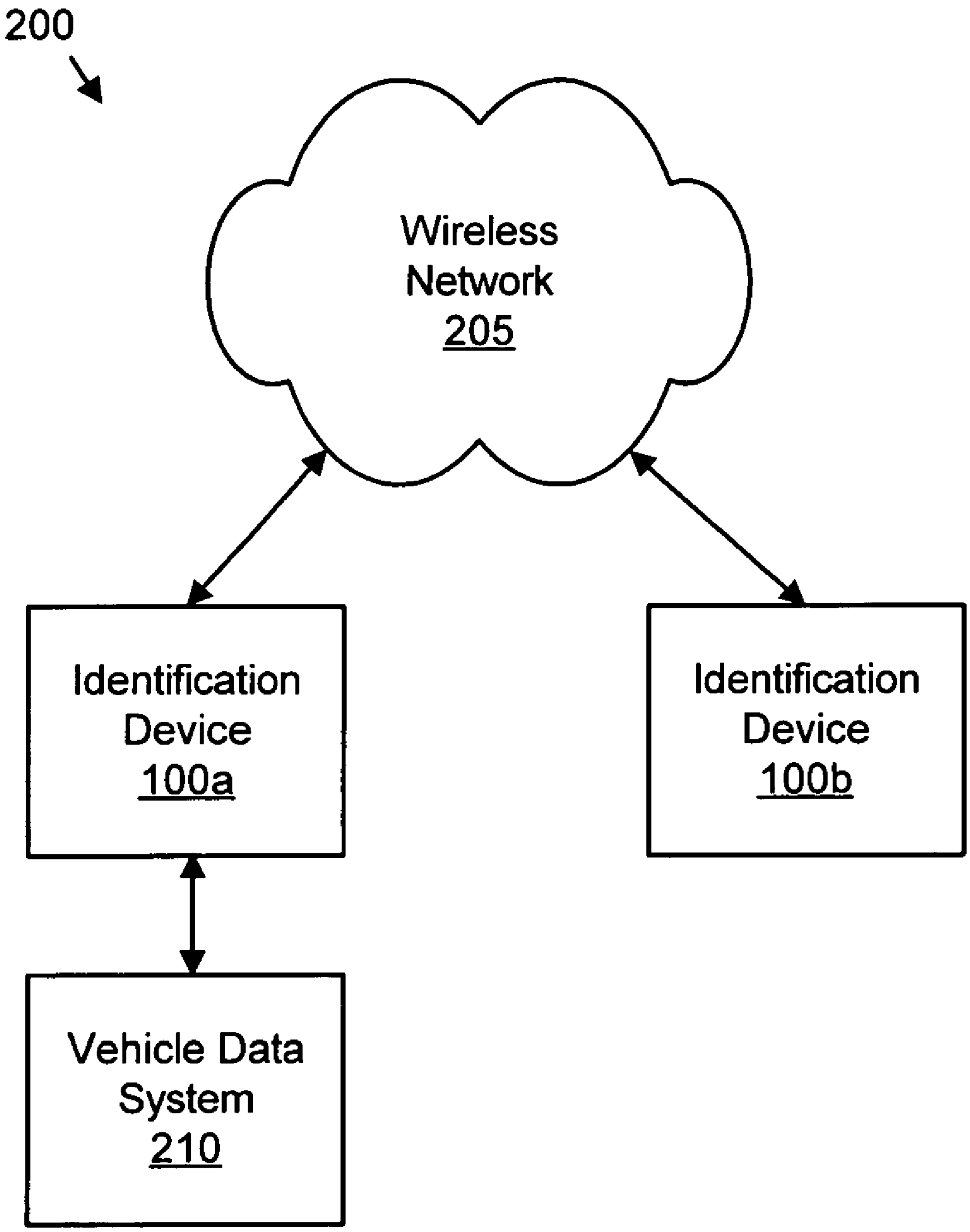
FIG. 2 is a block diagram illustrating one embodiment of an identification system of the present invention.

FIG. 2 is a block diagram of an identification system 200 of the present invention. The identification system 200 includes a wireless network 205, a vehicle data system 210, and one or more identification devices 100. The identification system 200 exchanges vehicle identifiers among one or more identification devices 100 over the wireless network 205. Although the identification system 200 is shown with two identification devices 100*a–b* connected through the wireless network 205, any number of identification devices 100 may connected.

In one embodiment, the vehicle data system 210 is factory installed. Using the factory-installed vehicle data system 210 may reduce the cost of implementing the identification device 100. In one embodiment, the vehicle data system gathers data from one or more vehicle sensors including one or more air bag sensors, a speedometer, an accelerometer, and the like. The identification device 100*a* is coupled to the vehicle data system 210. In the event of a collision, the identification device 100*a* receives a collision indication from the vehicle data system 210.

Responsive to the collision indication, the identification device 100*a* establishes a connection over the wireless network 205 with one or more wireless devices. In one embodiment, the identification device 100*a* identifies and communicates with one or more identification devices 100*b* connected to the wireless network 205. In a certain embodiment, the identification device 100*a* determines that the responding identification device 100*b* is responding to the collision before initiating communication with the responding identification device 100*b*. The identification device 100*a* may compare a time stamp of the collision indication with a time stamp from the responding identification device 100*b* to determine that the responding identification device 100*b* is responding to the collision. In an alternative embodiment, the identification device 100*a* may compare the identification device location with the location of the responding identification device 100*b* to determine that the responding identification device 100*b* is responding to the collision.

The identification device 100*a* exchanges vehicle identifiers with the responding identification device 100*b*. In one embodiment, the vehicle identifiers are encrypted. Using the vehicle data system 210 to supply the collision indication reduces the cost of implementing the identification device 100*a* while allowing the identification devices 100*a–b* to safely and accurately exchange vehicle identifiers after a collision.

Figure 3:
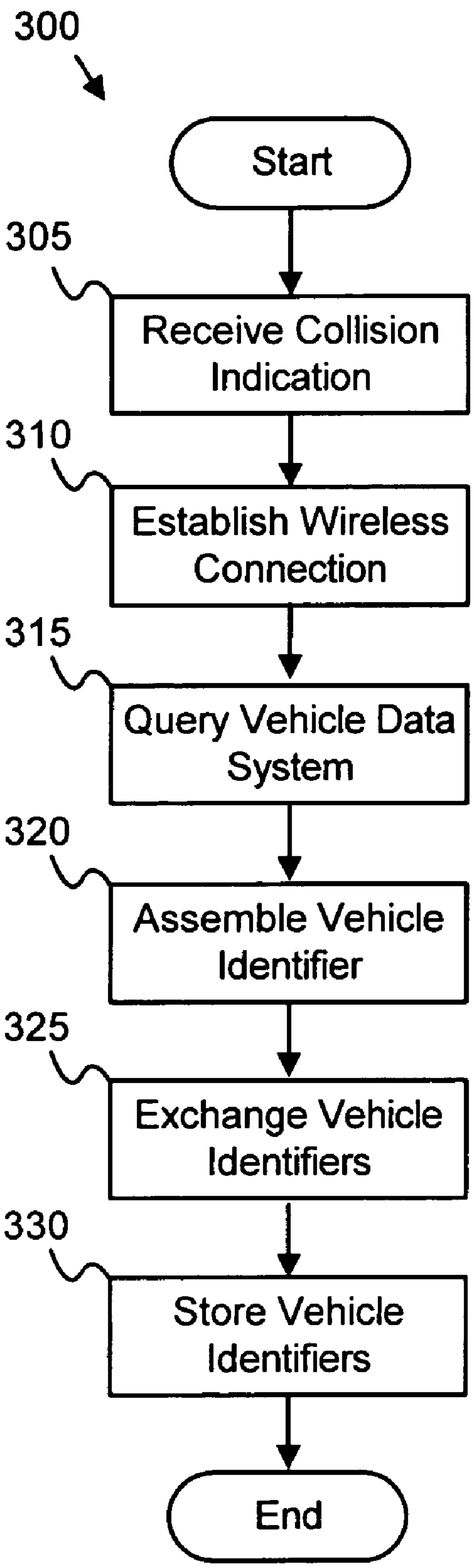
FIG. 3 is a flow chart diagram illustrating one embodiment of an identification process in accordance with the present invention.

FIG. 3 is a flow chart diagram illustrating one embodiment of an identification process 300 in accordance with the present invention. The identification process 300 exchanges vehicle identifiers between identification devices 100 in response to a collision. Although for purposes of clarity the identification process 300 is depicted in a certain sequential order, execution may be conducted in parallel and not necessarily in the depicted order.

The identification device 100 receives 305 a collision indication. In one embodiment, the vehicle data system 210 sends the collision indication. In an alternative embodiment, the identification device 100 generates the collision indication. Next, the identification device 100 establishes 310 a wireless network connection with one or more wireless devices, preferably identification devices 100. In one embodiment, the identification device 100 maintains the wireless connection with one or more identification devices 100.

In a certain embodiment, the identification device 100 queries 315 the vehicle data system 210 for a unique vehicle identification number. In an alternative embodiment, the identification device 100 is programmed with the unique vehicle identification number. Next, the identification device 100 assembles 320 a vehicle identifier based on the unique vehicle identification number.

In one embodiment, the identification device 100 queries the vehicle data system 210 for vehicle state information. The vehicle state information may include speed data, engine data, braking data, location data, time data, air bag data, and the like. In a certain embodiment, the vehicle state information is used to reconstruct the events of the collision. The vehicle state information may be encrypted.

Then, the identification device 100 exchanges 325 vehicle identifiers with one or more identification devices 100. In one embodiment, the identification device 100 exchanges 325 vehicle identifiers with identification devices 100 responding to similar collision indications. Finally, the identification device 100 stores 330 the vehicle identifiers. In a certain embodiment, the identification device 100 also stores the vehicle state information. The identification device 100 exchanges vehicle identifiers between one or more identification devices 100 subsequent to a collision. In addition, the identification device 100 stores the vehicle identifiers for later retrieval.

Figure 4:
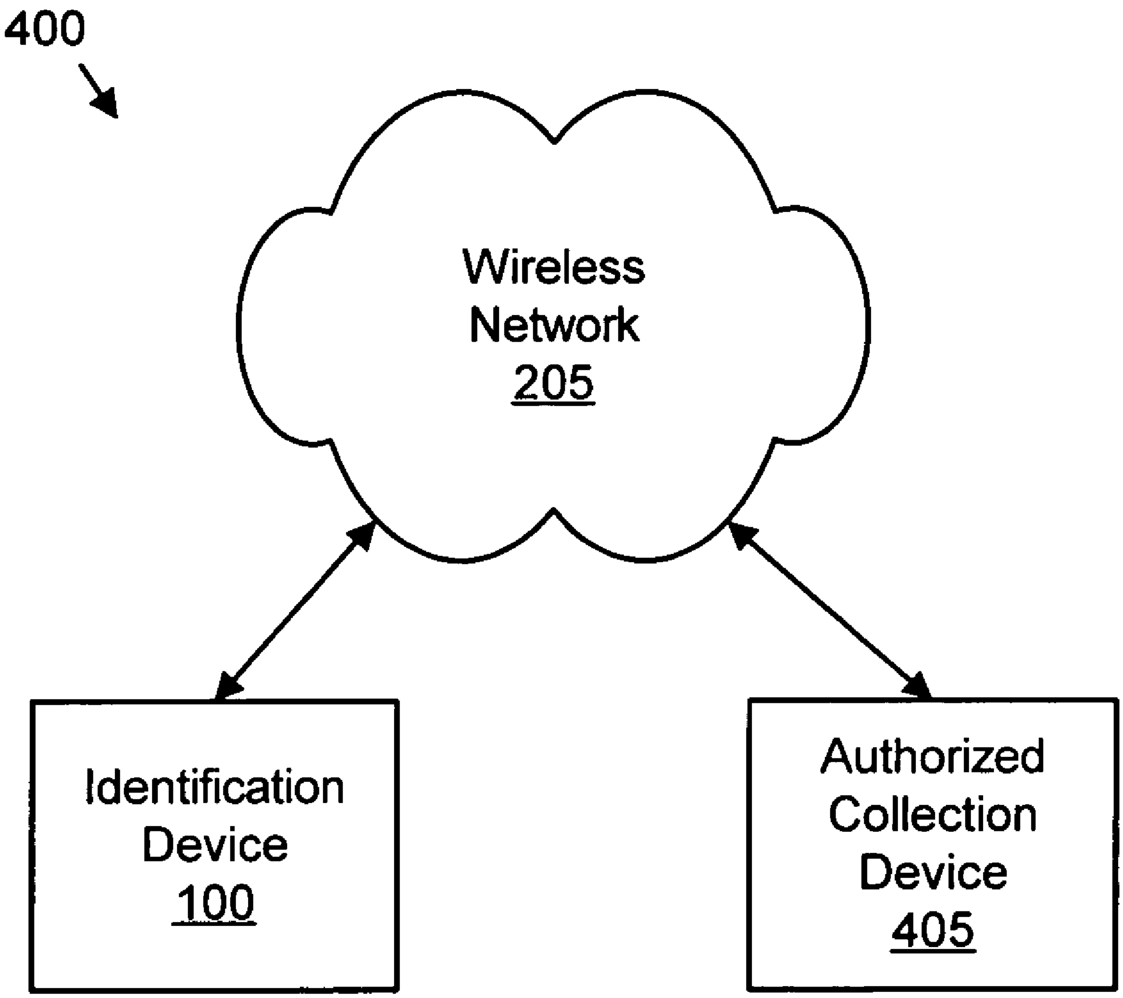
FIG. 4 is a block diagram illustrating one embodiment of an identifier retrieval system of the present invention.

FIG. 4 is a block diagram of an identifier retrieval system 400 of the present invention. The identifier retrieval system 400 includes a wireless network 205, an identification device 100, and an authorized collection device 405. The identifier retrieval system 400 retrieves vehicle identifiers from the identification device 100 to the authorized collection device 405. The authorized collection device 405 may be specialized hardware, or may be software integrated on a laptop, PDA, or other computing device. For example, a computer in a patrol car may comprise an authorized collection device 405. Although the identifier retrieval system 400 depicts one identification device 100 and one authorized collection device 405, one or more identification devices 100 and one or more authorized collection devices 405 may be employed.

In the depicted embodiment, the authorized collection device 405 establishes a connection to the identification device 100 through the wireless network 205. In an alternative embodiment, the authorized collection device 405 establishes a connection with the identification device 100 through a wired connection. The identification device 100 transmits one or more stored vehicle identifiers to the authorized collection device 405. In a certain embodiment, the identification device 100 transmits stored vehicle state information. The identification device 100 may encrypt all transmitted data. The identifier retrieval system 400 allows authorized users such as police investigators to retrieve vehicle identifiers subsequent to a collision. In an alternative embodiment, insurance investigators comprise authorized users.

Figure 5:
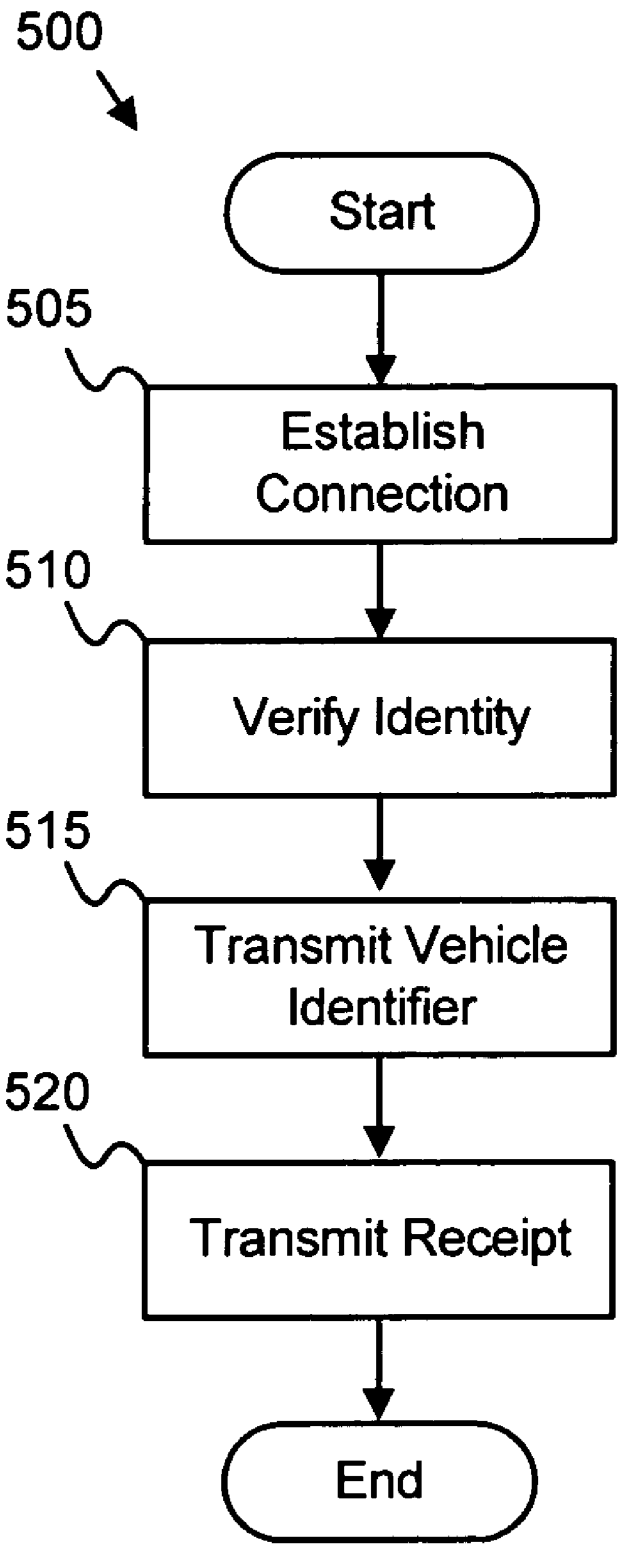
FIG. 5 is a flow chart diagram illustrating one embodiment of an identifier retrieval process in accordance with the present invention.

FIG. 5 is a flow chart diagram illustrating one embodiment of an identifier retrieval process 500 of the present invention. The identifier retrieval process 500 retrieves vehicle identifiers from the identification device 100. Although for purposes of clarity the Car identifier retrieval process 500 is depicted in a certain sequential order, execution may be conducted in parallel and not necessarily in the depicted order.

Initially, the authorized collection device 405 establishes 505 a connection with the identification device 100. In one embodiment, the connection is through a wireless network 205. In an alternative embodiment, the connection is through a wired connection. A cable connection may prevent unauthorized devices from retrieving vehicle identifiers.

In one embodiment, the identification device 100 verifies 510 the identity of the authorized collection device 405. In a certain embodiment, the identification device 100 transmits a code key to the authorized collection device 405 and the authorized collection device 405 responds with an appropriate code key to verify identity. In an alternative embodiment, the authorized collection device 405 transmits a code key to the identification device 100 to verify identity.

Once the authorized collection device 405 is authenticated, the identification device 100 transmits 515 one or more vehicle identifiers to the authorized collection device 405. In one embodiment, the identification device 100 also transmits vehicle status information to the authorized collection device 405. In a certain embodiment, the authorized collection device 405 transmits 520 a receipt to the identification device 100. The receipt may include a confirmation of the data received and the identity of the authorized collection device 405. The identifier retrieval process 500 communicates a vehicle identifier from an identification device 100 to an authorized collection device 405 to provide investigators with information on a collision.

Figure 6:
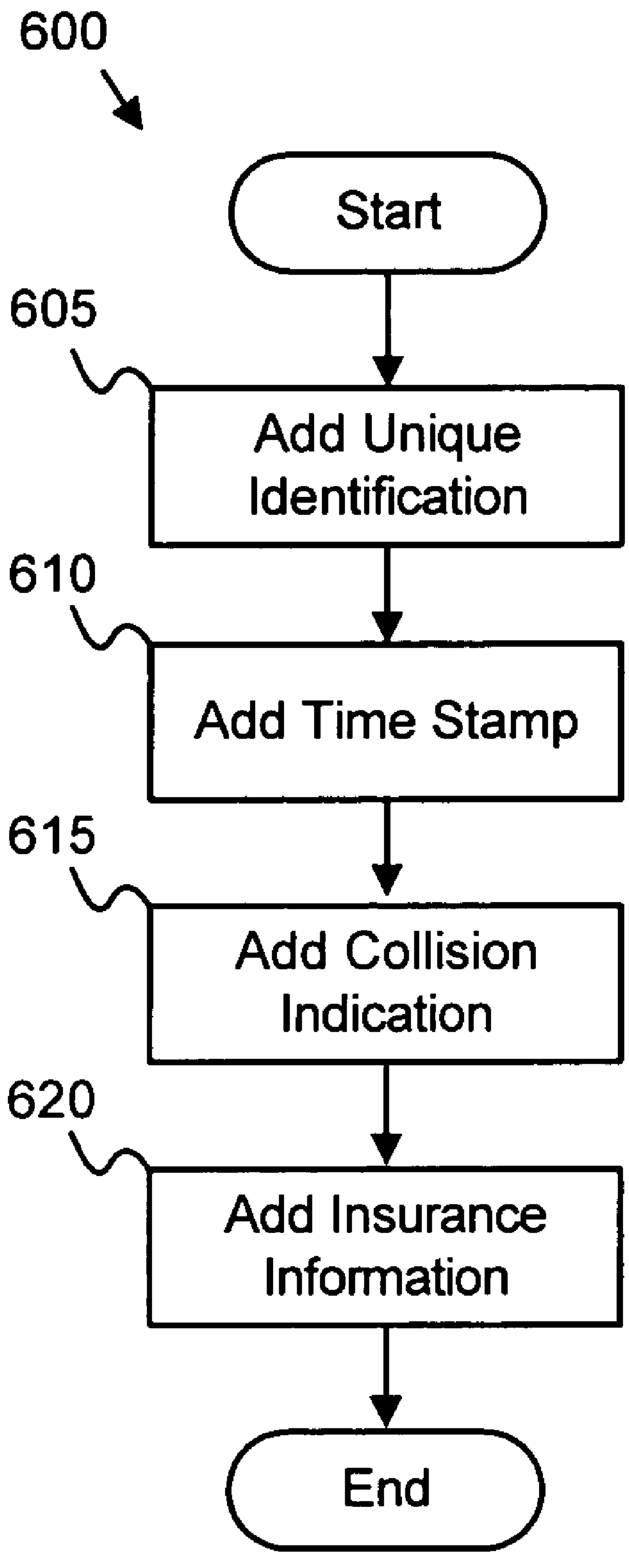
FIG. 6 is a flow chart illustrating one embodiment of an identifier assembly process of the present invention.

FIG. 6 is a flow chart illustrating one embodiment of a method 600 for assembling an identifier. Although for purposes of clarity the method 600 is depicted in a certain sequential order, execution may be conducted in parallel and not necessarily in the depicted order.

In one embodiment, the control module 115 adds 605 a unique vehicle identification number to the vehicle identifier. In one embodiment, control module 115 encrypts the unique vehicle identification number. Preferably, the authorized collection device 405 may decrypt an encrypted vehicle identification number.

Next, the control module 115 adds 610 a time stamp to the vehicle identifier. In one embodiment, the time stamp is the time of the collision indication. In an alternative embodiment, the time stamp is the current time. Next, the control module 115 adds 615 the collision indication to the vehicle identification. The collision indication may be speedometer data from the vehicle data system 210. The collision indication may also be the air bag status. In an alternative embodiment, the collision indication is saved with the vehicle status information.

In one embodiment, the control module 115 adds 620 the host vehicle's insurance information to the vehicle identifier. In a certain embodiment, the control module 115 encrypts the insurance information. The control module 115 assembles a vehicle identifier for transmission to an identification device 100 and for storage. In addition, the control module 115 organizes information that may be stored for later retrieval.

The present invention automatically detects collisions and exchanges identification information with another vehicle involved in the collision, reducing the risks of collecting information after a collision and increasing the accuracy of the information. In one embodiment, the present invention further reduces the cost of installing an identification device by using a vehicle's existing vehicle data system to generate a collision indication. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for exchanging vehicle information, comprising:

a communications module configured to establish a wireless connection wit a respondent identification device responsive to a collision indication;

a control module configured to identify a collision based on inputs from a vehicle data system, the control module configured to responsively assemble a vehicle identifier, verify that the respondent identification device is responding to the collision indication, send the vehicle identifier to the respondent identification device, and receive a respondent vehicle identifier from the respondent identification device;

a memory module configured to store the vehicle identifiers from a host vehicle and one or more respondent vehicles; and the communications module further configured to verify the identity of an authorized police collection device and transmit the stored vehicle identifiers received over the wireless network connection to the authorized police collection device.

2. The apparatus of claim 1, further comprising an interface module configured to connect with a vehicle data system of the host vehicle, the interface module further configured to receive a collision indication from the vehicle data system.

3. The apparatus of claim 2, wherein the interface module connects to the host vehicle data system over a wireless network.

4. The apparatus of claim 1, wherein the wireless communications are encrypted.

5. The apparatus of claim 1. wherein the memory module stores the state information of the host vehicle.

6. The apparatus of claim 1, further comprising a GPS module configured to locate the host vehicle.

7. The apparatus of claim 1, wherein the collision indication is generated by the control module.

8. A system for exchanging vehicle information, the system comprising:

a wireless network configured to facilitate communication between wireless devices;

a vehicle data system configured to detect and communicate a collision indication;

at least two identification devices, wherein the first identification device, responsive to a collision indication from the vehicle data system, assembles and stores a vehicle identifier of a host vehicle and establishes a wireless network connection with the second identification device, the first identification device further configured to verify that the second identification device is responding to the collision indication, send the host vehicle identifier to the second identification device, and receive a respondent vehicle identifier from the second identification device;

an authorized police collection device configured to establish a wireless network connection with the identification device;

the at least two identification devices further configured to verify the identity of the authorized police collection device, and wherein at least one identification device sends a plurality of vehicle identifiers to the authorized police collection device.

9. A method for exchanging vehicle information, comprising:

receiving a collision indication;

establishing a wireless network connection with a respondent identification device;

assembling a vehicle identifier;

verifying that the respondent identification device is responding to the collision indication;

exchanging vehicle identifiers with the respondent identification device over the wireless network connection;

storing the vehicle identifiers;

verifying an identity of an authorized police collection device; and transmitting a plurality of stored vehicle identifiers to the authorized police collection device.

10. The method of claim 9, further comprising querying a vehicle data system for vehicle identification information.

11. The method of claim 9, further comprising querying a vehicle data system for vehicle status information.

12. The method of claim 11, further comprising storing the vehicle status information.

13. The method of claim 9, wherein the vehicle data system comprises a vehicle control system.

14. The method of claim 9, wherein communications over the wireless network connection are encrypted.

15. A computer readable storage medium comprising computer readable code configured to carry out a process for exchanging vehicle information, the process comprising:

receiving a collision indication;

establishing a wireless network connection with a respondent identification device;

verifying that the respondent identification device is responding to the collision indication;

querying a vehicle data system for vehicle identification information;

assembling a vehicle identifier;

exchanging vehicle identifiers with the respondent identification device over the wireless network connection;

storing the vehicle identifiers;

verifying an identity of an authorized police collection device; and transmitting a plurality of stored vehicle identifiers to the authorized police collection device.

16. The computer readable storage medium of claim 15, further comprising computer readable code configured to assemble the vehicle identifier from the vehicle identification information.

17. The computer readable storage medium of claim 15, further comprising computer readable code configured to retrieve and store vehicle status informatian.

18. The computer readable storage medium of claim 15, further comprising computer readable code configured to encrypt communications over the wireless network.

19. The computer readable storage medium of claim 15, further comprising computer readable code configured to add time stamp data, collision indication data, and insurance information to the vehicle identifier.

20. An apparatus for exchanging vehicle information, the apparatus comprising:

means for receiving a collision indication;

means for querying a host vehicle data system for identification information;

means for assembling a vehicle identifier;

means for establishing a wireless network connection to a respondent identification device;

means for verifying that the respondent identification device is responding to the collision indication;

means for exchanging vehicle identifiers with the respondent identification device;

means for storing a plurality of vehicle identifiers;

means for verifying an identity of an authorized police collection device; and means for transmitting a plurality of stored vehicle identifiers to the authorized police collection device.

* * * * *